United States Patent [19]

Ebata et al.

[11] Patent Number: 4,484,972
[45] Date of Patent: Nov. 27, 1984

[54] METHOD FOR ADHESION OF SILICON NITRIDE PARTS

[75] Inventors: Yoshihiro Ebata, Kawanishi; Nobuyuki Tamari; Makoto Kinoshita, both of Ikeda; Yasuo Toibana, Osaka, all of Japan

[73] Assignee: Agency of Industrial Science & Technology Ministry of International Trade & Industry, Tokyo, Japan

[21] Appl. No.: 407,352

[22] Filed: Aug. 12, 1982

[30] Foreign Application Priority Data

Aug. 21, 1981 [JP] Japan .................................. 56-131683

[51] Int. Cl.$^3$ ................................................ C09J 1/00
[52] U.S. Cl. .......................................... 156/325; 65/23; 65/43; 106/1.25; 106/286.6; 156/89; 156/155; 156/283; 156/629; 428/446; 428/688; 428/698; 501/144; 501/151

[58] Field of Search .................. 156/89, 325, 155, 629, 156/283; 501/144, 151; 106/286.6, 1.25; 65/23, 43; 428/446, 698, 688, 307.7, 312.6, 317.7, 539.5; 29/423, 424

[56] References Cited

U.S. PATENT DOCUMENTS

| | | | |
|---|---|---|---|
| 2,548,344 | 4/1951 | Buerger et al. | 428/689 |
| 3,189,512 | 6/1965 | Stong | 156/325 |
| 3,325,266 | 6/1967 | Stong | 156/89 |
| 4,055,451 | 10/1977 | Cockbain et al. | 428/698 |
| 4,163,074 | 7/1979 | Ebata et al. | 106/73.2 |
| 4,269,641 | 5/1981 | Ebata et al. | 156/89 |

*Primary Examiner*—John J. Gallagher
*Attorney, Agent, or Firm*—Kurt Kelman

[57] ABSTRACT

Adhesion of two silicon nitride parts is accomplished by interposing a layer of calcium fluoride or a mixture of calcium fluoride with kaoline between the two silicon nitride parts and heating the resultant interposed layer.

8 Claims, No Drawings

METHOD FOR ADHESION OF SILICON NITRIDE PARTS

BACKGROUND OF THE INVENTION

This invention relates to a method for the adhesion of two silicon nitride parts.

Silicon nitride excels in strength, resistance to thermal shock, and resistance to chemicals. Because of these outstanding attributes, this compound is attracting attention as a new refractory material different in type from ceramics formed of metal oxides. Efforts are being continued to develop new uses for this compound in various fields.

Applicability of silicon nitride to the production of machines and tools for use at elevated temperatures, high-precision machine parts, heat exchangers, ceramic parts destined to be instantaneously heated to high temperatures, and thermal insulators for use in special circumstances is being studied.

In the production of such machines and tools as mentioned above, it often becomes necessary first to make their component parts and then to join them into finished products, for example. For successful assemblage of such silicon nitride parts of varying shapes, therefore, development of a method capable of providing fast adhesion of these component parts is a prime requisite.

Unfortunately, silicon nitride generally shows a very poor wetting property to molten substances and, unlike ceramics of oxides such as alumina and magnesia, possesses a strong covalent bond property and, therefore, has very low reactivity with other compounds. Since the thermal expansion coefficient of this compound is only about one half of that of alumina, adhesion of this compound is extremely difficult to obtain.

One common technique heretofore used to effect adhesion of two silicon nitride parts has resorted to the hot press method which carries out the adhesion in a hot press mold at elevated temperatures under high pressure. By this method, however, adhesion of silicon nitride parts of large dimensions or complicated shapes is obtained only with extreme difficulty because the operation is performed at high temperatures under high pressure. Even if such adhesion is obtained somehow or other by the hot press method, the strength of adhesion is not sufficient.

This invention has been perfected for the purpose of eliminating the aforementioned disadvantages suffered by the conventional method. It provides effective adhesion of two silicon nitride parts without entailing the harsh conditions of elevated temperatures and high pressure. By the method of this invention, these parts are joined with powerful adhesive strength as high as 800 kg/cm$^2$. Their faces joined by adhesion defy breakage, enjoy ample chemical stability, and excel in resistance to heat and thermal shock.

SUMMARY OF THE INVENTION

To be specific, this invention concerns a method for the adhesion of two silicon nitride parts, which method is characterized by the steps of interposing a layer of calcium fluoride or a mixture of calcium fluoride with kaoline between the two silicon nitride parts and heating the interposed layer to a temperature exceeding at least the decomposition point of calcium fluoride.

In this method, since the heating of the interposed layer is aimed at decomposing calcium fluoride, it can be effectively carried out under normal atmospheric pressure. The method, therefore, provides fast adhesion for silicon nitride parts of all shapes. Even machines and tools of highly complicate shapes can be obtained very easily by joining their component parts of silicon nitride by the method of this invention.

The other objects and features of this invention will become apparent from the further disclosure of this invention to be made hereinbelow.

DESCRIPTION OF PREFERRED EMBODIMENT

The chemical composition of silicon nitride which is the object of this invention is $Si_2N_3$, $SiN$, or $Si_3N_4$, or any combination thereof. The parts of silicon nitride to be joined may be in any of various shapes such as plates, pillars and blocks. This invention is not limited to any particular shapes of silicon nitride parts. The two parts of silicon nitride to be joined may be in one and the same shape or in different shapes.

Calcium fluoride generally available in the market may be used for the purpose of this invention. Although the purity of calcium fluoride is no critical factor, it is desired to be as high as practicable in order for the compound to produce high adhesive strength. Generally, calcium fluoride is used in a powdered form. It is generally used at a rate of 0.1 to 1 g per cm$^2$ of interfacial area of adhesion. If it is used at a lower rate, it fails to produce sufficient adhesive strength. If it is used at a higher rate, excess calcium fluoride flows out of the joined faces of the parts and sticks to the outer faces of the joined product.

Kaoline generally available in the market may be used advantageously for the purpose of this invention. The selection of kaoline is not affected by the kind of rocks from which kaoline is derived, the size of crystals of kaoline, the history, etc. Similarly to calcium fluoride, it is desired to have as high purity as practicable to ensure production of amply high adhesive strength. Preferably, the purity is at least 99.8%.

When a mixture of calcium fluoride with kaoline is used, the mixing ratio of the two compounds generally falls in the range of 99 to 50% by weight of calcium fluoride to 1 to 50% by weight of kaoline. Kaoline functions to enhance the adhesive ability of calcium fluoride as will be described afterward. If the proportion of kaoline in the mixture exceeds 50% by weight, the reactivity between calcium fluoride and kaoline falls short of reaching the required level and, as the result, kaoline alone partially separates off the mixture and remains uncombined with calcium fluoride. The mixture of calcium fluoride with kaoline may be used in its powdered form. Optionally, it may be used in the form of paste obtainable by intimately blending the mixture with an organic tackiness agent such as, for example, balsam or printing ink. The application rate of the paste is desired to fall in the range of 0.01 to 0.2 g per cm$^2$ of interfacial area of adhesion, in terms of the combined weight of calcium fluoride and kaoline (excluding the weights of balsam and other additives). If the application rate is lower, the paste fails to produce sufficient adhesive strength. If it is higher, excess paste flows out of the faces of adhesion and sticks to the outer faces of the joined product.

As described above, this invention concerns a method which comprises interposing a layer of calcium fluoride or a mixture of calcium fluoride with kaoline between two silicon nitride parts and heating the interposed layer to a temperature at least exceeding the decomposition point of calcium fluoride. The term "decomposition point" as used herein means the temperature at which calcium fluoride decomposes with liberation of fluorine. Normally, the temperature exceeds 1200° C. and falls roughly in the range of 1400° to 1500° C. If the heating is effected at a temperature not reaching the decomposition point, calcium fluoride fails to decompose itself and liberate fluorine gas, i.e. calcium fluoride can no longer serve as an adhesive agent. Generally, this heating is carried out in the ambient air. To prevent silicon nitride against possible oxidation, the heating is desired to be carried out under a blanket of nitrogen particularly when the heating lasts for a long time.

Both calcium fluoride and kaoline are desired to have as high purity as practicable. Actually, however, they inevitably contain small amounts of impurities; $K_2O$, $Na_2O$, MO, and $Fe_2O_3$ in the case of calcium fluoride and $Na_2O$, MgO, and $Fe_2O_3$ in the case of kaoline. It is, therefore, necessary to effect the heating at a temperature proper for the particular composition of the adhesive agent in actual use. The aforementioned range of heating temperature has been fixed in due consideration of this fact.

After the interposed layer has been heated as described above, it is left to cool off naturally or given forced cooling. Consequently, the two parts of silicon nitride are joined fast to each other with the interposed layer serving as an adhesive agent.

The strong adhesion of the silicon nitride parts accomplished by the method of this invention is believed to be substantially governed by the following principle.

In the first place, at or above the decomposition point of calcium fluoride, calcium fluoride undergoes thermal decomposition with liberation of fluorine gas. The liberated fluorine gas goes to corrode and erode the opposed surfaces of silicon nitride parts to a great extent. In the meantime, calcium or a reaction product of calcium and kaoline which occurs in consequence of the thermal decomposition forms an intermediate layer between the silicon nitride parts. This intermediate layer functions as an adhesive agent.

The calcium or the reaction product of calcium and kaoline penetrates the surface regions of the silicon nitride parts which have been corroded by the liberated fluorine gas, bringing the opposed surfaces of the parts into tight union. The interposed layer, thus, produces high adhesive strength never attained in the past. Particularly when the reaction product of calcium which issues from the decomposition of calcium fluoride and kaoline functions as an adhesive agent, since calcium is activated by kaoline, the penetration of calcium into the corroded surface regions of silicone nitride parts is accelerated. Consequently, there is obtained more powerful adhesive strength.

In accordance with the present invention described above, the adhesive strength with which the two silicone nitride parts are joined to each other is at least 500 kg/cm$^2$ and can increase up to 800 kg/cm$^2$, as compared with the adhesive strength of about 500 kg/cm$^2$ obtainable by the conventional method (Measurement for bending strength). When joined products obtained by the method of this invention are tested for bending strength, ruptures invariably occur at portions other than their interfaces of adhesion. This fact clearly indicates that the actual adhesive strength even surpasses the maximum mentioned above. The interfaces of adhesion excel in resistance to chemicals and heat and amply endure severe thermal shocks. The joined parts obtained by the method of this invention, therefore, are advantageously usable as components for machines and tools which are destined to be exposed to intense heat and thermal shocks.

Now, the present invention will be described more specifically below with reference to working examples.

EXAMPLE 1

Between two silicon nitride plates 1 cm in width, 1 cm in length, and 0.5 cm in thickness, powdered calcium fluoride was interposed at a rate of 0.5 g per cm$^2$ of interfacial area of adhesion and heated at 1480° C. for 30 minutes in an electric furnace. After this heating, the joined plates were cooled and then tested for adhesive strength by the measurement of three-point bending strength under a load of 5000 kg at a speed of 3 m/min. They were consequently found to possess an extremely high adhesive strength of 540 kg/cm$^2$.

EXAMPLE 2

Between two silicon nitride plates of the same size as in Example 1, a mixture consisting of 80% of powdered calcium fluoride and 20% of powdered kaoline (by weight) was interposed at a rate of 0.5 g per cm$^2$ of interfacial area of adhesion and heated at 1480° C. for 30 minutes. After this heating, the joined plates were cooled and tested for adhesive strength by the measurement of bending strength by following the procedure of Example 1. They were found to possess a maximum adhesive strength of 800 kg/cm$^2$.

EXAMPLE 3

Joined plates were obtained by following the procedure of Example 2, except that the mixing ratio of powdered calcium fluoride and powdered kaoline was varied as indicated in Table 1. They were tested for adhesive strength by the measurement of bending strength at rupture. The results were as shown in the following table.

TABLE 1

| Calcium fluoride (% by weight) | 100 | 90 | 80 | 70 | 50 |
|---|---|---|---|---|---|
| Kaoline (% by weight) | 0 | 10 | 20 | 30 | 50 |
| Adhesive strength (kg/cm$^2$) | 520 | 540 | 800 | 620 | 670 |

It is noted from this table that the joined plates obtained herein showed notably higher levels of adhesive strength than the adhesive strength (500 kg/cm$^2$) obtained by the conventional hot press method. When the ruptured surfaces of the joined plates were examined after the measurement of bending strength, it was found that all these ruptures occurred at portions other than the interfaces of adhesion. This fact clearly implies that their actual magnitudes of adhesive strength far surpassed the values indicated in the table. When the test specimens were kept immersed in an aqueous 48% KOH solution at 70° C. for 50 hours, their interfaces of adhesion were observed to remain intact.

When the test specimens were heated to 1480° C. and then thrown in water by way of quench test, again, their interfaces of adhesion were observed to remain intact.

EXAMPLE 4

The procedure of Example 3 was repeated, except that the temperature of heating was changed to 1400° C. The results were as shown in Table 2.

TABLE 2

| Calcium fluoride (% by weight) | 100 | 90 | 80 | 70 | 50 |
|---|---|---|---|---|---|
| Kaoline (% by weight) | 0 | 10 | 20 | 30 | 50 |
| Adhesive strength (kg/cm$^2$) | 512 | 530 | 770 | 660 | 680 |

EXAMPLE 5

The procedure of Example 3 was repeated, except that the temperature of heating was changed to 1350° C. The results were as shown in Table 3.

TABLE 3

| Calcium fluoride (% by weight) | 100 | 90 | 80 | 70 | 50 |
|---|---|---|---|---|---|
| Kaoline (% by weight) | 0 | 10 | 20 | 30 | 50 |
| Adhesive strength (kg/cm$^2$) | 505 | 538 | 780 | 648 | 662 |

What is claimed is:

1. A method for the adhesion of two silicon nitride parts, said method comprising interposing a mixture of 99% to 50% by weight of calcium fluoride and 1% to 50% by weight of kaolin between the two silicon nitride parts and heating the mixture to a temperature not lower than the decomposition point of calcium fluoride.

2. The method as defined in claim 1, wherein the mixture is in a powdered form.

3. The method as defined in claim 1, wherein the mixture is in the form of paste obtained by mixing the mixture with a pasting agent.

4. The method as defined in claim 1, wherein the mixture is interposed between the two silicon nitride parts at a ratio of 0.01 to 0.2 grams per cm$^2$ of interfacial area.

5. The method as defined in claim 2, wherein the mixture is interposed between the two silicon nitride parts at a ratio of 0.01 to 0.2 grams per cm$^2$ of interfacial area.

6. The method as defined in claim 3, wherein the mixture is interposed between the two silicon nitride parts at a ratio of 0.01 to 0.2 grams per cm$^2$ of interfacial area.

7. The method as defined in claim 1, wherein the mixture is heated to a temperature in the range of 1200° C. to 1500° C.

8. The method as defined in claim 1, wherein the mixture is heated to a temperature in the range of 1400° C. to 1500° C.